US012628017B2

(12) United States Patent
Yuan et al.

(10) Patent No.: US 12,628,017 B2
(45) Date of Patent: May 12, 2026

(54) DYNAMIC SIGNALING FOR MEASUREMENT GAP

(71) Applicant: Nokia Technologies Oy, Espoo (FI)

(72) Inventors: Ping Yuan, Beijing (CN); Jing He, Beijing (CN); Tero Henttonen, Espoo (FI); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 721 days.

(21) Appl. No.: 17/904,178

(22) PCT Filed: Feb. 13, 2020

(86) PCT No.: PCT/CN2020/075150
§ 371 (c)(1),
(2) Date: Aug. 12, 2022

(87) PCT Pub. No.: WO2021/159417
PCT Pub. Date: Aug. 19, 2021

(65) Prior Publication Data
US 2023/0107338 A1 Apr. 6, 2023

(51) Int. Cl.
*H04L 5/00* (2006.01)
*H04W 24/04* (2009.01)
(Continued)

(52) U.S. Cl.
CPC ........... *H04W 24/10* (2013.01); *H04L 5/0053* (2013.01); *H04W 24/08* (2013.01)

(58) Field of Classification Search
CPC .... H04L 5/0053; H04L 5/0098; H04W 24/04; H04W 24/10
See application file for complete search history.

(56) References Cited

U.S. PATENT DOCUMENTS

| | | | |
|---|---|---|---|
| 2015/0312787 A1 | 10/2015 | Das et al. | |
| 2016/0337893 A1 | 11/2016 | Gheorghiu et al. | |

(Continued)

FOREIGN PATENT DOCUMENTS

| | | | |
|---|---|---|---|
| CN | 102448107 A | 5/2012 | |
| CN | 102714816 A | 10/2012 | |

(Continued)

OTHER PUBLICATIONS

Office action received for corresponding Chinese Patent Application No. 202110135643.7, dated Feb. 17, 2023, 8 pages of office action and no page of translation available.
Extended European Search Report received for corresponding European Patent Application No. 20918818.4, dated Oct. 19, 2023, 7 pages.
"Report of 3GPP TSG RAN2#107", 3GPP TSG-RAN WG2 meeting #107bis, R2-1912001, Agenda: 2.2, Etsi mcc, Aug. 26-30, 2019, pp. 1-317.

(Continued)

*Primary Examiner* — Faruk Hamza
*Assistant Examiner* — Abusayeed M Haque
(74) *Attorney, Agent, or Firm* — Brake Hughes Bellermann LLP

(57) ABSTRACT

Example embodiments of the present disclosure relate to devices, methods, apparatuses and computer readable storage media of dynamic signaling for a measurement gap. The method comprising receiving, from a second apparatus, information at least comprising an indication of a set of frequency bands associated with an measurement to be performed at the first apparatus; determining a requirement of a measurement gap for the measurement based on the information; and transmitting a message associated with the requirement to the second apparatus. In this way, a network controlled signaling management may be achieved, which may reduce the overhead of the signaling and improve the system performance.

20 Claims, 5 Drawing Sheets

(51) Int. Cl.
  H04W 24/08      (2009.01)
  H04W 24/10      (2009.01)

(56)               References Cited

U.S. PATENT DOCUMENTS

| | | | | |
|---|---|---|---|---|
| 2016/0338118 A1 | 11/2016 | Vajapeyam et al. | | |
| 2018/0006774 A1 | 1/2018 | Yiu et al. | | |
| 2022/0232487 A1* | 7/2022 | Yang | ..................... | H04W 52/20 |
| 2022/0240281 A1* | 7/2022 | Wang | ................... | H04L 5/0053 |

FOREIGN PATENT DOCUMENTS

| | | | | | |
|---|---|---|---|---|---|
| CN | 106664539 | A | 5/2017 | | |
| CN | 107409027 | A | 11/2017 | | |
| CN | 109788497 | * | 11/2017 | ............ | H04L 5/001 |
| CN | 107637120 | A | 1/2018 | | |
| CN | 109788497 | A | 5/2019 | | |
| CN | 109803304 | A | 5/2019 | | |
| EP | 2624628 | A1 | 8/2013 | | |
| EP | 3697124 | A1 | 8/2020 | | |
| TW | 201703562 | A | 1/2017 | | |
| WO | 2020/223966 | A1 | 11/2020 | | |

OTHER PUBLICATIONS

"Report of [107#81][NR TEI16] Need-for-Gaps signalling", 3GPP TSG-RAN WG2 Meeting #107bis, R2-1913847, Agenda: 11.20.1, MediaTek Inc, Oct. 14-18, 2019, 10 pages.

"Measurement gap capability information for Rel-16 UE", 3GPP TSG RAN WG2 Meeting #108, R2-1914580, Agenda: 6.20.1, Intel Corporation, Nov. 18-22, 2019, pp. 1-7.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

International Search Report and Written Opinion received for corresponding Patent Cooperation Treaty Application No. PCT/CN2020/075150, dated Nov. 17, 2020, 9 pages.

"Measurement Gap Configuration for EN-DC", 3GPP TSG-RAN WG2 Meeting#NR AdHoc, R2-1800625, Agenda: 10.4.1.4.2, Samsung, Jan. 22-26, 2018, 4 pages.

Office action received for corresponding Chinese Patent Application No. 202110135643.7, dated Aug. 3, 2022, 8 pages of office action and no page of translation available.

* cited by examiner

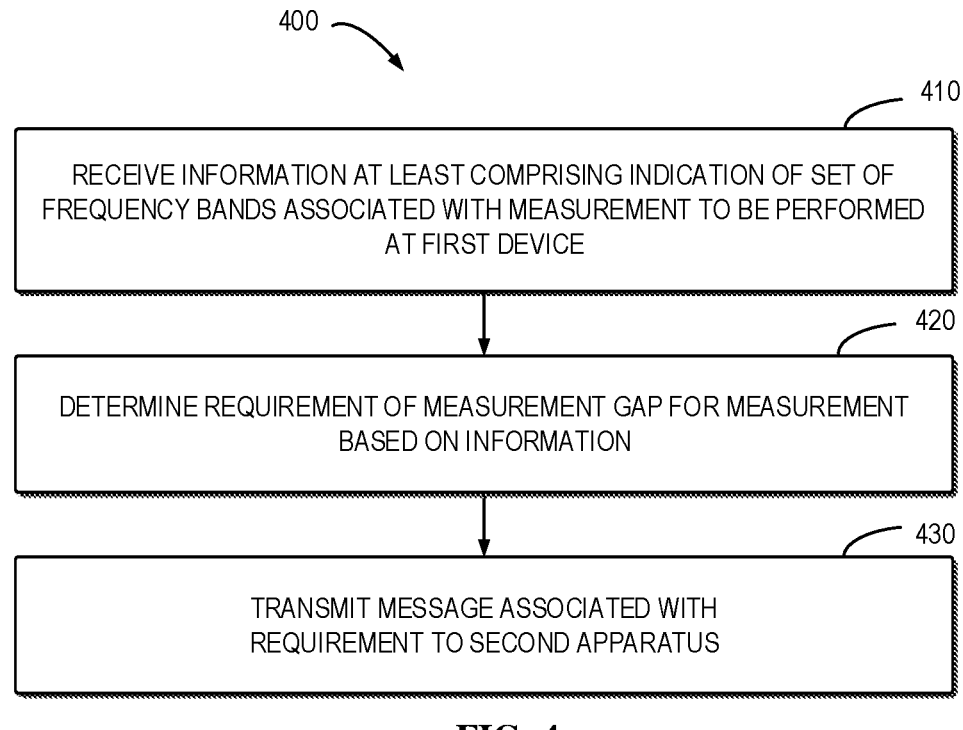

400

410

RECEIVE INFORMATION AT LEAST COMPRISING INDICATION OF SET OF FREQUENCY BANDS ASSOCIATED WITH MEASUREMENT TO BE PERFORMED AT FIRST DEVICE

420

DETERMINE REQUIREMENT OF MEASUREMENT GAP FOR MEASUREMENT BASED ON INFORMATION

430

TRANSMIT MESSAGE ASSOCIATED WITH REQUIREMENT TO SECOND APPARATUS

FIG. 4

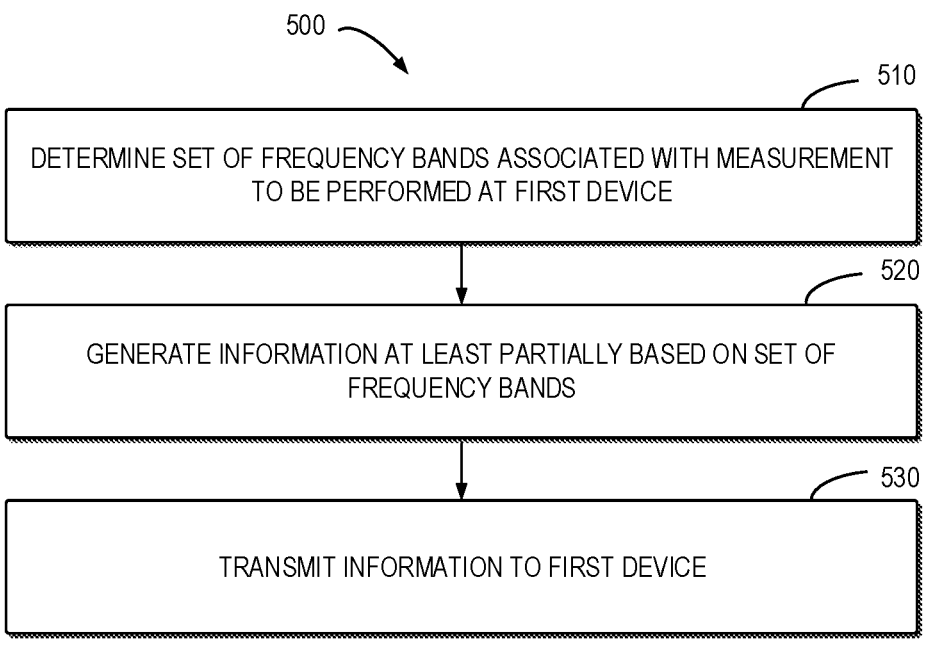

500

510

DETERMINE SET OF FREQUENCY BANDS ASSOCIATED WITH MEASUREMENT TO BE PERFORMED AT FIRST DEVICE

520

GENERATE INFORMATION AT LEAST PARTIALLY BASED ON SET OF FREQUENCY BANDS

530

TRANSMIT INFORMATION TO FIRST DEVICE

DYNAMIC SIGNALING FOR MEASUREMENT GAP

RELATED APPLICATION

This application claims priority to PCT Application No. PCT/CN2020/075150, filed on Feb. 13, 2020.

FIELD

Embodiments of the present disclosure generally relate to the field of telecommunication and in particular, to a device, method, apparatus and computer readable medium of dynamic signaling for a measurement gap.

BACKGROUND

As mentioned above, a configuration of measurement gap may be required for a gap assisted measurement performed at a terminal device depending on the capability of the terminal device. In general, the measurement gap may be referred to as a gap in which a terminal device will interrupt the data transmission to serving cell and perform the signal measurement to target cell.

The 5G Radio Access Network (RAN) decided to introduce the capability signalling "NeedForGap" in Release 16 to improve the data transmission efficiency. The network will configure measurement gap for a terminal device only in the case that the terminal device reports NeedForGap=true, otherwise no measurement gap will be configured to the terminal device.

The motivation to introduce this dynamic NeedForGap signaling procedure is that, whether the terminal device could perform gapless measurement not only depends on the current band combination but also some parameters that define the occupation of some band resource. In a conventional way, the terminal device may have to set NeedForGap=TRUE in most cases unless this terminal device can support gapless measurement for all kinds of Layer 1 (L1) configuration in the band combination.

SUMMARY

In general, example embodiments of the present disclosure provide a solution of dynamic signaling for a measurement gap.

In a first aspect, there is provided a first apparatus. The first apparatus comprises at least one processor; and at least one memory including computer program codes; the at least one memory and the computer program codes are configured to, with the at least one processor, cause the first apparatus at least to receive, from a second apparatus, information at least comprising an indication of a set of frequency bands associated with a measurement to be performed at the first apparatus; determine a requirement of a measurement gap for the measurement based on the information; and transmit a message associated with the requirement to the second apparatus.

In a second aspect, there is provided a second apparatus. The second apparatus comprises at least one processor; and at least one memory including computer program codes; the at least one memory and the computer program codes are configured to, with the at least one processor, cause the second apparatus at least to determine a set of frequency bands associated with a measurement to be performed at a first apparatus; generate information at least partially based on the set of frequency bands; and transmit the information to the first apparatus.

In a third aspect, there is provided a method. The method comprises receiving, from a second apparatus, information at least comprising an indication of a set of frequency bands associated with a measurement to be performed at the first apparatus; determining a requirement of a measurement gap for the measurement based on the information; and transmitting a message associated with the requirement to the second apparatus.

In a fourth aspect, there is provided a method. The method comprises determining a set of frequency bands associated with a measurement to be performed at a first apparatus; generating information at least partially based on the set of frequency bands; and transmitting the information to the first apparatus.

In a fifth aspect, there is provided an apparatus comprising means for receiving, from a second apparatus, information at least comprising an indication of a set of frequency bands associated with a measurement to be performed at the first apparatus; means for determining a requirement of a measurement gap for the measurement based on the information; and means for transmitting a message associated with the requirement to the second apparatus.

In an sixth aspect, there is provided an apparatus comprising means for determining a set of frequency bands associated with a measurement to be performed at a first apparatus; means for generating information at least partially based on the set of frequency bands; and means for transmitting the information to the first apparatus.

In a seventh aspect, there is provided a computer readable medium comprising a computer program for causing an apparatus to perform at least the method according to the third aspect.

In an eighth aspect, there is provided a computer readable medium comprising a computer program for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 4 shows a flowchart of a method implemented at a first apparatus in accordance with some example embodiments of the present disclosure;

FIG. 5 shows a flowchart of a method implemented at a second apparatus in accordance with some example embodiments of the present disclosure;

Throughout the drawings, the same or similar reference numerals represent the same or similar element.

DETAILED DESCRIPTION

Figure 1:
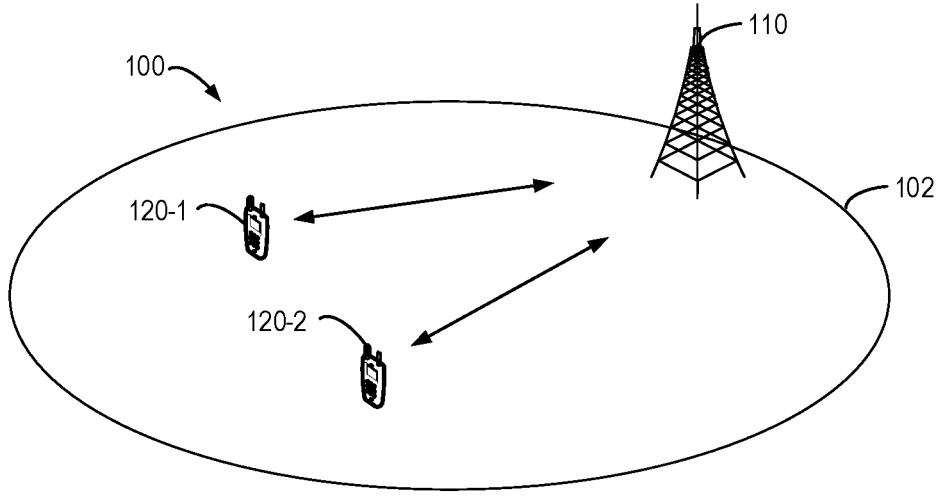
FIG. 1 shows an example communication network in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptopmounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 comprises terminal devices 120-1 and 120-2 (hereafter also referred to as a terminal device 120 or a first apparatus 120 collectively) and a network device 110 (hereafter also referred to as a second apparatus 110). The terminal devices 120-1 and 120-2 may communicate with the network device 110. The terminal devices 120-1 and 120-2 may communicate with each other. The serving area of the network device 110 is called as a cell 102. It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As mentioned above, a configuration of measurement gap may be required for a gap assisted measurement performed at a terminal device depending on the capability of the terminal device, such as an inter-frequency measurement or an inter-RAT measurement. In general, the measurement gap may be referred to as a gap in which a terminal device interrupt the data transmission to serving cell and perform the signal measurement to target cell.

The 5G Radio Access Network (RAN) decided to introduce the capability signalling "NeedForGap" in Release 16 to improve the data transmission efficiency. The network will configure measurement gap for a terminal device only in the case that the terminal device reports NeedForGap=true, otherwise no measurement gap will be configured to the terminal device.

In a conventional way, the terminal device will report full NeedForGap capability to a network device, which brings huge signal overhead. Furthermore, if the network device has to get new NeedForGap capability from the terminal device every time the serving cell's band combination is reconfigured, which is not friendly for procedures that need prior knowledge before configurating/modifying measurements.

The motivation to introduce this dynamic NeedForGap signaling procedure is that, whether the terminal device could perform gapless measurement not only depends on the current band combination but also some parameters that define the occupation of some band resource. It has been discussed that how to define the dynamic NeedForGap signalling and it has been proposed that the measurement gap requirement information is reported back by the terminal device in the terminal response to a configuration RRC message of the network device. However, the issue on when and how to report NeedForGap signalling in RRC response message is still open.

Therefore, embodiments of the present disclosure propose a scheme of dynamic signaling for the measurement gap, which may realize an effective way to report the requirement of the measurement gap of the terminal device. In this way, a network controlled signaling management may be achieved, which may reduce the overhead of the signaling and improve the system performance.

Figure 2:
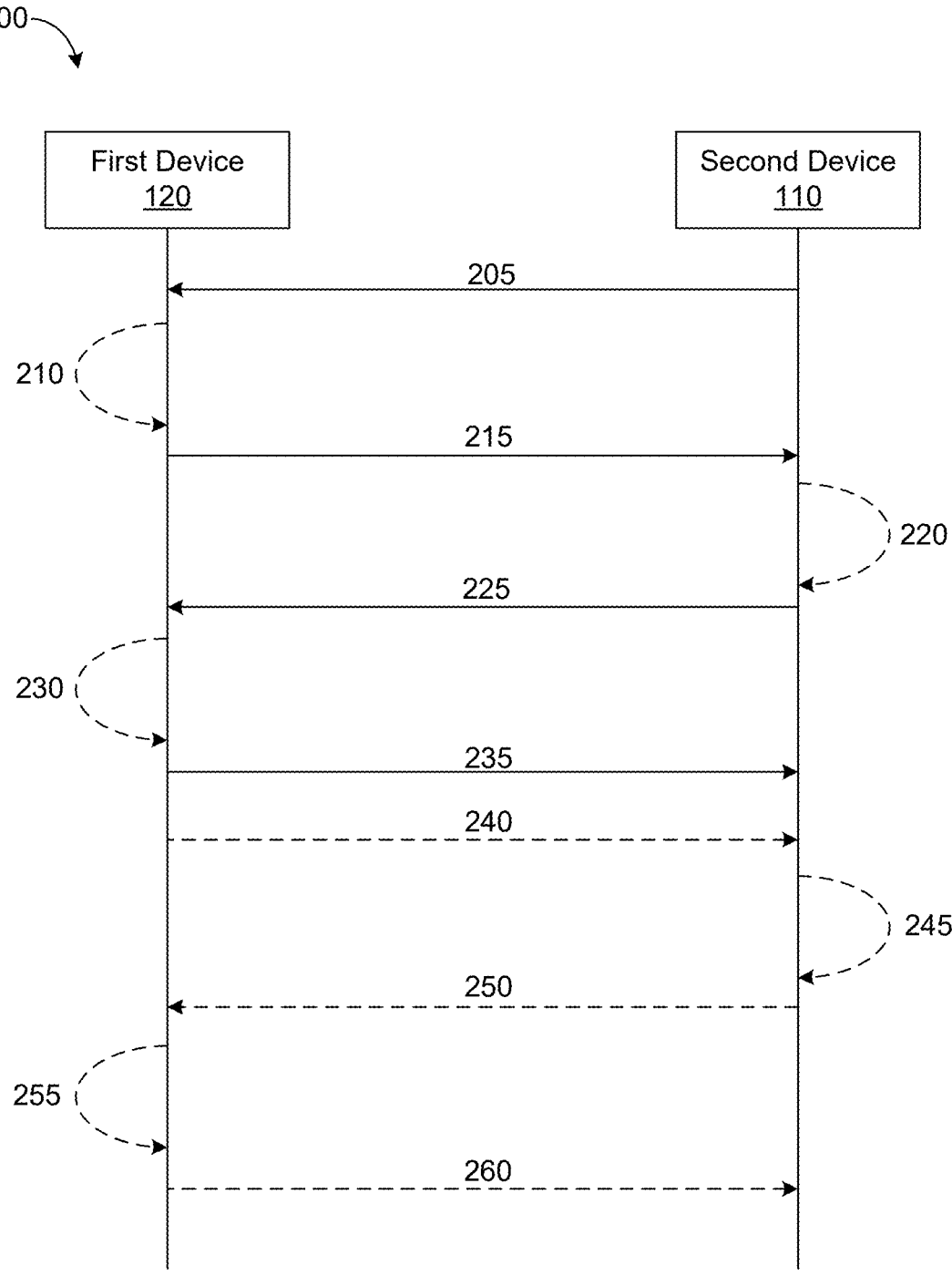
FIG. 2 shows a signaling chart illustrating dynamic signaling for a measurement gap according to some example embodiments of the present disclosure.

Principle and implementations of the present disclosure will be described in detail below with reference to FIGS. 2 to 5. FIG. 2 shows a signaling chart illustrating dynamic signaling for a measurement gap according to some example embodiments of the present disclosure. For the purpose of discussion, the process 200 will be described with reference to FIG. 1. The process 200 may involve the first apparatus 120 and the second apparatus 110 as illustrated in FIG. 1. It would be appreciated that although the process 200 has been described in the communication network 100 of FIG. 1, this process may be likewise applied to other communication scenarios.

As shown in FIG. 2, the network device 110 may transmit 205 information comprising an indication of a set of frequency bands associate with a measurement. The network device 110 may transmit the information via a Radio Reconfiguration (RRC) signaling or other possible downlink RRC message with other configuration parameters of the reconfiguration procedure. For example, the set of frequency bands may be referred to as a set of source frequency bands for the measurement or a set of possible target frequency bands for the measurement. Alternatively, the set of frequency bands may also be referred to as both the source frequency bands and the target frequency bands. Furthermore, the information may also comprise possible L1 configuration, for example, an indication of a Multi-Input Multi-Output (MIMO) layer.

After the terminal device 120 receives the information from the network device 110, the terminal device 120, the terminal device may determine 210 whether the measurement gap is needed for the measurement. For example, the terminal device 120 may determine the requirement of the measurement gap based on the set of frequency bands, the corresponding parameters comprised in the information and the capability of the terminal device 120. Herein the "capability" may be referred to a type of the terminal device and the number of the transceiver comprised in the terminal device, etc. For example, if the terminal device has a plurality of transceivers, it may support a gapless measurement.

To determine the requirement of the measurement gap, the terminal device 120 may determine which frequency band(s) are indicated in the information. An example, the information received from the network device 110 can be shown as below.

TABLE 1

| An example enquiry for the requirement of the measurement gap | |
| --- | --- |
| MeasConfig := | SEQUENCE { |
|     measObjectToRemoveList |     MeasObjectToRemoveList |
| OPTIONAL,  -- Need N | |
|     measObjectToAddModList |     MeasObjectToAddModList |
| OPTIONAL,  -- Need N | |
|     reportConfigToRemoveList |     ReportConfigToRemoveList |
| OPTIONAL,  -- Need N | |
|     reportConfigToAddModList |     ReportConfigToAddModList |
| OPTIONAL,  -- Need N | |
|     measIdToRemoveList |     MeasIdToRemoveList |
| OPTIONAL,  -- Need N | |
|     measIdToAddModList |     MeasIdToAddModList |
| OPTIONAL,  -- Need N | |
|     s-MeasureConfig |     CHOICE { |
|         ssb-RSRP |         RSRP-Range, |
|         csi-RSRP |         RSRP-Range |
|     } | |
| OPTIONAL,  -- Need M | |
|     quantityConfig |     QuantityConfig |
| OPTIONAL,  -- Need M | |
|     measGapConfig |     MeasGapConfig |
| OPTIONAL,  -- Need M | |
|     measGapSharingConfig |     MeasGapSharingConfig |
| OPTIONAL,  -- Need M | |
|     ... | |
|   , | |
|     [[ | |
|     sourceBC-ForGapEnquiry |     SEQUENCE (SIZE (1..maxSimultaneousBands)) OF BandParameters |
| OPTIONAL, | |
|         targetBandsfForGapEnquiry |     FreqBandList |
| OPTIONAL, | |
|       ]] | |
|     } | |

In Table 1, it can be seen that the information may refer to an indication of source frequency bands and/or an indication of target frequency bands. In Table 1, the possible L1 configuration is not included.

The following Table shows another example of the information received from the network device 110.

TABLE 2

| An example enquiry for the requirement of the measurement gap | |
| --- | --- |
| MeasConfig ::= | SEQUENCE{ |
|     measObjectToRemoveList |     MeasObjectToRemoveList |
| OPTIONAL,  -- Need N | |
|     measObjectTo AddModList |     MeasObjectToAddModList |
| OPTIONAL,  -- Need N | |
|     reportConfigToRemoveList |     ReportConfigToRemoveList |
| OPTIONAL,  -- Need N | |
|     reportConfigToAddModList |     ReportConfigToAddModList |
| OPTIONAL,  -- Need N | |
|     measIdToRemoveList |     MeasIdToRemoveList |
| OPTIONAL,  -- Need N | |

TABLE 2-continued

An example enquiry for the requirement of the measurement gap

```
        measIdToAddModList              MeasIdToAddModList
OPTIONAL,   -- Need N
        s-MeasureConfig                 CHOICE {
            ssb-RSRP                        RS RP-Range,
            csi-RSRP                        RS RP-Range
        }
OPTIONAL,   -- Need M
        quantityConfig                  QuantityConfig
OPTIONAL,   -- Need M
        measGapConfig                   MeasGapConfig
OPTIONAL,   -- Need M
        measGapSharingConfig            MeasGapSharingConfig
OPTIONAL,   -- Need M
    ...

,
    [[
    sourceBC-ForGapEnquiry              CHOICE {
            sourceBC,                       SEQUENCE (SIZE (L.maxSimultaneousBands)) OF
BandParameters,
            currentBC                       NULL,
            sourceBCList                    SEQUENCE (SIZE (1..maxBandComb)) OF BandCombinations
    }                                                       OPTIONAL,   -- Need N
        targetBandsForGapEnquiry        CHOICE {
            measObjectList                  MeasObjectTo AddModList,
            currentM easConfig              NULL,
            currentAndMeasObjectList    MeasObjectToAddModList
    }                                                   OPTIONAL,   -- Need N
    reportingMode                       ENUMERATED {perCarrier, singleBit} OPTIONAL   -- Need N
        ]]
    }
```

In Table 2, the information may also refer to an indication of source frequency bands and/or an indication of target frequency bands. For example, in sourceBC-ForGapEnquiry, the item SourceBC may be referred to as bands that would be configured for the terminal device, the item CurrentBC may be referred to as currently configured band combination (BC), after the reconfiguration, and the item SourceBCList may be referred to as a list of source BCs (so the network device 110 may indicate multiple possible configurations). In targetBandsForGapEnquiry, the item MeasObjectList may include a list of measurement objects to measure (with all the relevant SMTC information if needed) or currently measured objects, or the combination of above.

It should be understood that the examples in Tables 1 and 2 are shown only for the purpose of illustration and help those skilled in the art to understand and implement the present disclosure, without suggesting any limitation as to the scope of the disclosure. Any other suitable form of the message may also be considered as a part of the present disclosure.

That is, the terminal device 120 may obtain, from the information, at least one of a set of source frequency bands and a set of target frequency band associated with the measurement. Depending on the different frequency bands indicated in the information, the terminal device 120 may determine the requirement for the measurement gap.

For example, if the terminal device 120 determines a set of source frequency bands for the measurement from the information, the terminal device 120 may determine a set of target frequency bands for the measurement and further determine the requirement of the measurement gap related to the set of source frequency bands and the set of target frequency bands. If the terminal device 120 determines a set of target frequency bands to be measured for the measurement from the information, the terminal device 120 may determine the requirement of the measurement gap related to the set of target frequency bands and at least one source frequency band for the measurement supported by the first apparatus. The at least one source frequency band may be referred to as all or a portion of source frequency bands supported by the terminal device 120, or a current frequency band of a cell serving the terminal device 120.

As an option, if the terminal device 120 determines a set of source frequency bands and a set of target frequency bands to be measured for the measurement from the information, the terminal device 120 may determine the requirement of the measurement gap related to both the set of source frequency bands and the set of target frequency bands.

If the terminal device 120 determines the measurement gap is needed for the measurement, the terminal device 120 may transmit 215 message associated with the requirement for reporting its gap capability to the network device 110. For example, the requirement may be transmitted to the network device 110 via a RRC response message, such as RRCReconfigurationComplete. The message may comprise an indication that a configuration of the measurement gap is required for at least one pair of a source frequency band and a target frequency band for the measurement or an indication that a configuration of the measurement gap is not required for at least one pair of a source frequency band and a target frequency band for the measurement.

An example for reporting the gap capability of the terminal device 120 may be shown as below.

TABLE 3

| An example for reporting the gap capability |
| --- |

```
-- ASN1 START
--TAG-RRCRECONFIGURATIONCOMPLETE-START
RRCReconfigurationComplete :=                SEQUENCE {
    rrc-TransactionIdentifier                    RRC-TransactionIdentifier,
    criticalExtensions                           CHOICE {
        rrcReconfigurationComplete                   RRCReconfigurationComplete-IEs,
        criticalExtensionsFuture                     SEQUENCE { }
    }
}
RRCReconfigurationComplete-IEs :=            SEQUENCE {
    lateNonCriticalExtension                     OCTET STRING
OPTIONAL,
    nonCriticalExtension                         RRCReconfigurationComplete-v1530-IEs
OPTIONAL
}
RRCReconfigurationComplete-v1530-IEs :=      SEQUENCE {
    uplinkTxDirectCurrentList                    UplinkTxDirectCurrentList
OPTIONAL,
    nonCriticalExtension                         RRCReconfigurationComplete-v1560-IEs
OPTIONAL
}
RRCReconfigurationComplete-v1560-IEs :=      SEQUENCE {
    scg-Response                                 CHOICE {
        nr-SCG-Response                              OCTET STRING (CONTAINING
RRCReconfigurationComplete),
        eutra-SCG-Response                           OCTET STRING
    }
OPTIONAL,
    nonCriticalExtension                         RRCReconfigurationComplete-v15xy-IEs
OPTIONAL
}
RRCReconfigurationComplete-v15xy- IEs :=     SEQUENCE {
    needForGaps-v15xy                                CHOICE {
        noGap-v15xy                      NULL,
        needGap-v15xy                    NULL,
        noGapsPerBand-v15xy        FreqBandindicator,
        noGapsPerBandPerBC-v15xy   FreqBandinformation
    }
OPTIONAL,
    nonCriticalExtension                         SEQUENCE { }
    OPTIONAL
}
--TAG-RRCRECONFIGURATIONCOMPLETE-STOP
-- ASN1STOP
```

In the Table 3, the first item noGaps-v15xy is the single bit indication which indicates the terminal device 120 doesn't need gap for anything, whereas the second item needGaps-v15xy indicates that the terminal device 120 needs gaps for all cases. Then the third item noGapsPer-Band-v15xy indicates that for which target frequency bands the terminal device 120 does not need gaps, and the fourth item noGapsPerBandPerBC-v15xy indicates that for which source frequency bands the terminal device 120 does not need gaps.

It should be understood that the examples in Table 3 are shown only for the purpose of illustration and help those skilled in the art to understand and implement the present disclosure, without suggesting any limitation as to the scope of the disclosure. Any other suitable form of the message may also be considered as a part of the present disclosure.

Based on the requirement from the terminal device 120, the network device 110 may determine for which frequency bands the terminal device needs the gap and configure 220 the corresponding gap parameters for the measurement. The gap parameters may include parameters such as a length of the gap, a start time of the gap, etc.

Then the network device 110 may transmit 225 the configured gap parameters to the terminal device 120. The terminal device 120 may 230 perform the measurement based on the gap parameters configured by the network device 110 and transmit 235 an indication indicating that the measurement is completely performed to the network device 110. For example, the indication may be transmitted to the network device 110 via a RRC message, such as RRCRecon-figurationComplete.

As another option, although the gap configuration is configured based on the requirement reported by the terminal device, the terminal device 120 may also change its requirement when it receives the gap parameter. That is, the terminal deice 120 may perform the measurement based on the gap parameters only when the terminal device 120 determines that the frequency bands previously reported in the requirement still need the gap parameters. If the terminal device 120 further determines a portion of the frequency bands from the frequency bands previously reported does not need a measurement gap, the terminal device 120 may further transmit 240 a further message indicating the requirement for the measurement gap to the network device 110 to update its gap capability.

Similar with acts 220-235, the network device 110 may determine for which frequency bands the terminal device needs the gap and configure 245 the corresponding gap parameters for the measurement. Then the network device 110 may transmit 250 the configured gap parameters to the terminal device 120. The terminal device 120 may 255 perform the measurement based on the gap parameters configured by the network device 110 and transmit 260 an indication indicating that the reconfiguration is completely performed to the network device 110. For example, the indication may be transmitted to the network device 110 via a RRC message, such as RRCReconfigurationComplete.

In this solution, the terminal device may determine the requirement of the measurement gap based on the specific frequency bands indicated by the network device, so that a network controlled NeedForGap signaling is realized to reduce the signaling overhead.

As another option, the network device may configure the gap parameters for available frequency bands supported by the terminal device 120, especially for all frequency bands supported by the terminal device 120, rather than for the specific frequency bands. That is, the network device 110 may not enquiry the gap capability of the terminal device 120 before the configuration of the gap parameters. This solution may be described in detail with FIG. 3.

Figure 3:
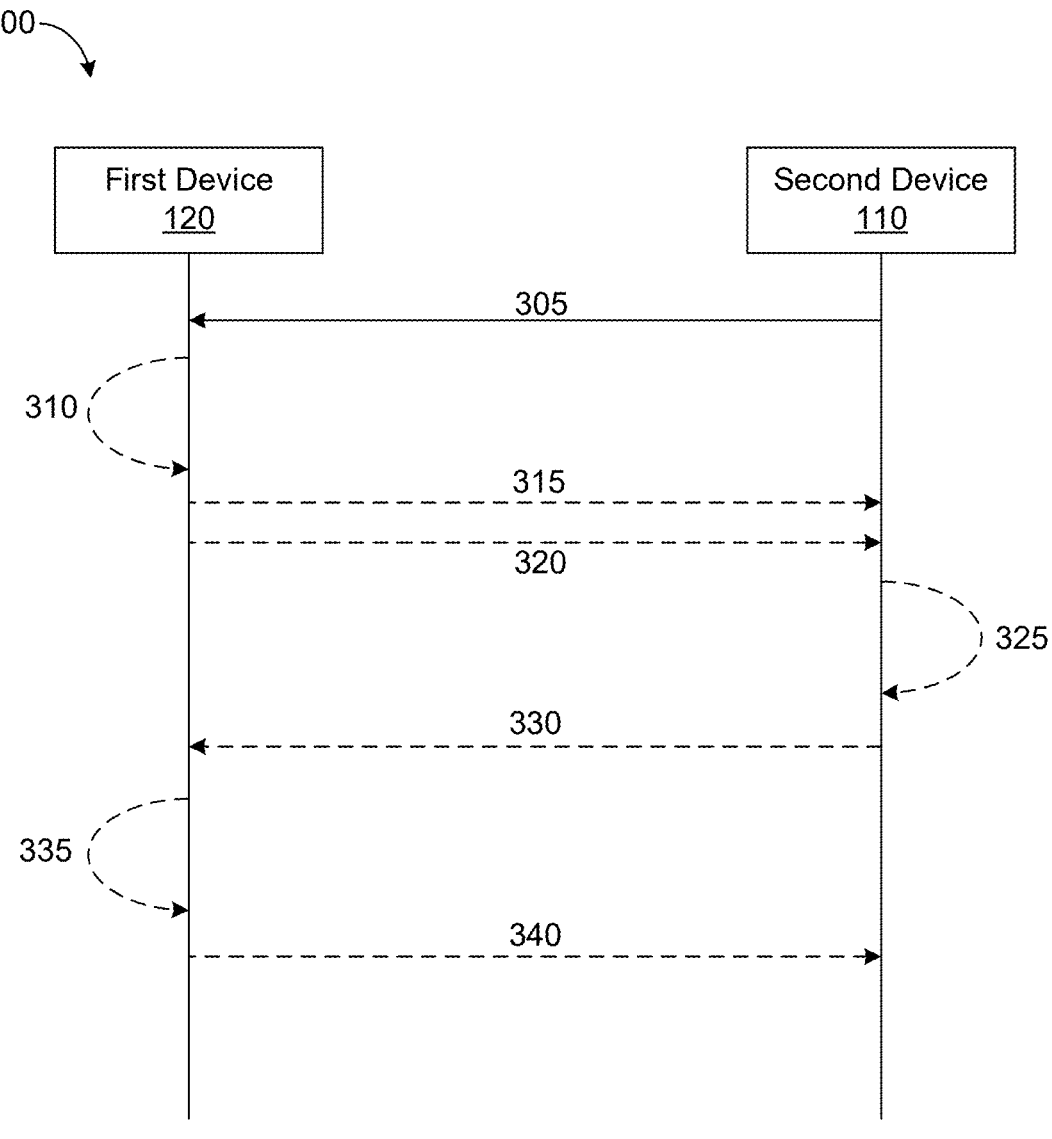
FIG. 3 shows a signaling chart illustrating dynamic signaling for a measurement gap according to some example embodiments of the present disclosure.

FIG. 3 shows a signaling chart illustrating dynamic signaling for a measurement gap according to some example embodiments of the present disclosure. For the purpose of discussion, the process 300 will be described with reference to FIG. 1. The process 200 may involve the first apparatus 120 and the second apparatus 110 as illustrated in FIG. 1. It would be appreciated that although the process 300 has been described in the communication network 100 of FIG. 1, this process may be likewise applied to other communication scenarios.

Before the configuration of the gap parameters, the network device 110 may determine the available frequency bands supported by the terminal device 120, for example, through a typical enquiry procedure to the terminal device 120. Herein the available frequency bands may include all frequency bands supported by the terminal device 120 or a portion of them.

In some example embodiments, if the terminal device 120 supports both LTE network and NR network, the network device 110 may configure gap parameters for both networks according to their corresponding frequency bands requirements.

Then the network device 110 may determine a set of configured frequency bands to be measured in the measurement from the available frequency bands supported by the terminal device 120 and configure the gap parameters for the terminal device 120 to perform the measurement related to the set of configured frequency bands and transmit 305 an indication of the set of configured frequency bands along with the gap parameters to the terminal device 120.

Then the terminal device 120 determines 310, based on the set of configured frequency bands and its corresponding parameters, a requirement of measurement gap for the measurement.

In a case that there is only a set of frequency bands related to the NR network indicated by the network device, if the terminal device 120 determines that the measurement gap is necessary for the set of configured frequency bands, the terminal device 120 may perform the measurement based on the gap parameters. The terminal device 120 may transmit 315 a message for indicating that the measurement gap is needed. For example, the message may be a RRC message, such as RRCReconfigurationComplete.

Only when the terminal device 120 determines a portion of the frequency bands does not need a measurement gap, the terminal device 120 may further transmit 320 a message indicating the requirement for the measurement gap to the network device 110 to update its gap capability. For example, the indication may comprise an indication that a configuration of the measurement gap is required for at least one target frequency band for the measurement, an indication that a configuration of the measurement gap is not required for at least one target frequency band for the measurement, or an indication that at least one predetermined pattern for the measurement gap is not applied for the measurement.

Then the network device 110 may determine, based on the message, for which frequency bands the terminal device needs the gap and configure 325 a further gap parameters for the measurement.

The network device 110 then may transmit 330 the further gap parameters to the terminal device 120. The terminal device 120 may perform 335 the measurement based on the gap parameters configured by the network device 110 and transmit 340 an indication indicating that the reconfiguration is completely performed to the network device 110. For example, the indication may be transmitted to the network device 110 via a RRC message, such as RRCReconfigurationComplete.

In a case that the network device 110 configures gap parameters for both LTE and NR networks according to their corresponding frequency bands requirements, if the terminal device 120 determines that a measurement gap is not needed for the given frequency bands for the NR network, the terminal device 120 may transmit a report of the requirement for the measurement gap to the network device 110 to indicate no gap is need for the NR network. Then the network device 120 may configure a further gap parameters related to the frequency bands for the LTE network. As another option, the terminal device 120 may also maintain the original gap parameters, i.e. gap parameters for both networks.

If the terminal device 120 determines that no measurement gap is needed for the NR network and the LTE network, the terminal device 120 may transmit a report of the requirement for the measurement gap to the network device 110 to indicate no gap is need for the measurement at all. For example, the report may be transmitted to the network device 110 via a RRC message, such as RRCReconfigurationComplete.

In this way, on the one hand, the dynamic NeedForGap signalling may have limited message size by restricting the specific bands to those bands supported by the network device instead of all bands supported by the terminal device, therefore the bits waste may be avoided in Uu interface and meanwhile the multiple source band combinations may be supported with the dynamic NeedForGap signalling by considering parameters of different source band combinations. On the other hand, this solution may enable the network to support one-step RRC Reconfiguration with both mobility/Scell addition/release command and measurement/measurement gap configuration.

FIG. 4 shows a flowchart of an example method 400 implemented at a device in accordance with some example embodiments of the present disclosure. For the purpose of discussion, the method 400 will be described from the perspective of the first apparatus 120 with reference to FIG. 1.

At 410, the first apparatus 120 receives, from a second apparatus 110, information at least comprising an indication of a set of frequency bands associated with an measurement to be performed at the first apparatus 120.

In some example embodiments, the first apparatus 120 may receive at least one of the following: an indication of a set of source frequency bands for the measurement; an indication of a set of target frequency bands to be measured for the measurement; and an indication of a a set of configured frequency bands to be measured in the measurement and a set of parameters for the measurement gap related to the set of configured frequency bands.

At 420, the first apparatus 120 determines a requirement of a measurement gap for the measurement based on the information.

In some example embodiments, if the first apparatus 120 determines, from the information, an indication of a set of source frequency bands for the measurement, the first apparatus 120 may determine a set of target frequency bands for the measurement and determine the requirement of the measurement gap related to the set of source frequency bands and the set of target frequency bands.

In some example embodiments, if the first apparatus 120 determines, from the information, an indication of a set of target frequency bands to be measured for the measurement, the first apparatus 120 may determine the requirement of the measurement gap related to the set of target frequency bands and at least one source frequency band for the measurement supported by the first apparatus.

In some example embodiments, if the first apparatus 120 determines, from the information, an indication of a set of source frequency bands and a set of target frequency bands to be measured for the measurement, the first apparatus 120 may determine the requirement of the measurement gap related to the set of source frequency bands and the set of target frequency bands.

In some example embodiments, if the first apparatus 120 determines, from the information, an indication of a set of configured frequency bands to be measured in the measurement and a set of parameters for the measurement gap related to the set of configured frequency bands the first apparatus 120 may determine the requirement of a measurement gap related to the set of available frequency bands.

At 430, the first apparatus 120 transmits a message associated with the requirement to the second apparatus.

In some example embodiments, the first apparatus 120 may transmit at least one of the following: an indication that a configuration of the measurement gap is required for at least one pair of a set of source frequency bands and a target frequency band for the measurement; an indication that a configuration of the measurement gap is not required for at least one pair of a set of source frequency bands and a target frequency band for the measurement; an indication that a configuration of the measurement gap is required for at least one target frequency band for the measurement; an indication that a configuration of the measurement gap is not required for at least one target frequency band for the measurement; and an indication that at least one predetermined pattern for the measurement gap is not applied for the measurement.

In some example embodiments, the first apparatus 120 may receive, from the second apparatus, a set of parameters for the measurement gap configured by the second apparatus based on the requirement and perform the measurement based on the set of parameters.

In some example embodiments, the first apparatus 120 may transmit a message indicating that the measurement gap is needed, if the terminal device 120 determines that the measurement gap is needed for a set of configured frequency bands to be measured in the measurement based on the requirement.

In some example embodiments, the first apparatus 120 may transmit a message indicating that the portion of frequency bands supports the measurement without the measurement gap, if the terminal device 120 determines that the measurement gap related to a portion of frequency bands in a set of configured frequency bands to be measured in the measurement is not needed based on the requirement.

In some example embodiments, the first apparatus 120 may receive, from the second apparatus, a further set of parameters for the measurement gap related to the set of configured frequency bands other than the portion of frequency bands and perform the measurement based on the further set of parameters.

FIG. 5 shows a flowchart of an example method 500 implemented at a device in accordance with some example embodiments of the present disclosure. For the purpose of discussion, the method 500 will be described from the perspective of the second apparatus 110 with reference to FIG. 1.

At 510, the second apparatus 110 determines a set of frequency bands associated with a measurement to be performed at a first apparatus.

At 520, the second apparatus 110 generates information at least partially based on the set of frequency bands.

In some example embodiments, the second apparatus 110 may generate at least one of the following an indication of a set of source frequency bands for the measurement; an indication of a set of target frequency bands to be measured for the measurement; and an indication of a set of configured frequency bands to be measured in the measurement and a set of parameters for the measurement gap related to the set of configured frequency bands.

At 530, the second apparatus 110 transmits the information to the first apparatus.

In some example embodiments, the second apparatus 110 may receive from the first apparatus, a message associated with a requirement of a measurement gap for the measurement. The second apparatus 110 may further determine a set of parameters for the measurement gap based on the requirement and transmit the set of parameters to the first apparatus.

In some example embodiments, the second apparatus 110 may receive a message indicating that a portion of frequency bands in a set of configured frequency bands to be measured in the measurement supports the measurement without the measurement gap. The second apparatus 110 may further determine a further set of parameters for the measurement gap related to the set of configured frequency bands other than the portion of frequency bands and transmit the further set of parameters to the first apparatus.

In some example embodiments, an apparatus capable of performing any of the method 400 (for example, the first apparatus 120) may comprise means for performing the respective steps of the method 400. The means may be implemented in any suitable form. For example, the means may be implemented in a circuitry or software module.

In some example embodiments, the apparatus comprises means for receiving, from a second apparatus, information at least comprising an indication of a set of frequency bands associated with an inter-frequency measurement to be performed at the first apparatus; means for determining a requirement of a measurement gap for the measurement based on the information; and means for transmitting a message associated with the requirement to the second apparatus.

In some example embodiments, an apparatus capable of performing any of the method 500 (for example, the second apparatus 110) may comprise means for performing the respective steps of the method 500. The means may be implemented in any suitable form. For example, the means may be implemented in a circuitry or software module.

In some example embodiments, the apparatus comprises means for determining a set of frequency bands associated with a measurement to be performed at a first apparatus; means for generating information at least partially based on the set of frequency bands; and means for transmitting the information to the first apparatus.

Figure 6:
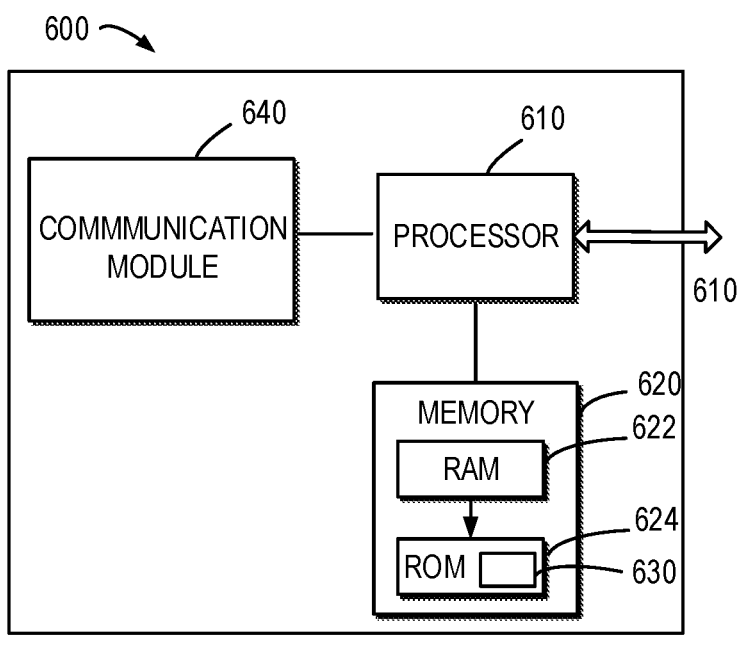
FIG. 6 illustrates a simplified block diagram of an apparatus that is suitable for implementing some other embodiments of the present disclosure.

FIG. 6 is a simplified block diagram of a device 600 that is suitable for implementing embodiments of the present disclosure. The device 600 may be provided to implement the communication device, for example the first apparatus 120 or the second apparatus 110 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
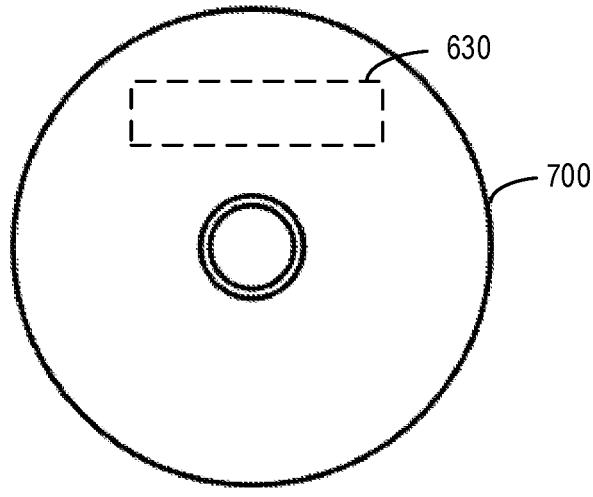
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 and 500 as described above with reference to FIGS. 3, 4 and 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:

at least one processor; and at least one memory including computer program codes;

the at least one memory and the computer program codes are configured to, with the at least one processor, cause the first apparatus at least to:

receive, from a second apparatus, information at least comprising an indication of a set of frequency bands of a plurality of frequency bands supported by the first apparatus and associated with a measurement to be performed at the first apparatus, wherein the information indicates the first apparatus to report a requirement of a measurement gap related to the set of frequency bands, and wherein the set of frequency bands is a subset of the plurality of frequency bands supported by the first apparatus and associated with the measurement;

determine a requirement of a measurement gap for the measurement based on the information; and transmit a message associated with the requirement to the second apparatus.

2. The apparatus of claim 1, wherein when receiving the information, the at least one memory and the computer program codes are configured to, with the at least one processor, cause the first apparatus to:

receive the information by receiving at least one of the following:

an indication of a set of source frequency bands for the measurement;

an indication of a set of target frequency bands to be measured for the measurement; and an indication of a set of configured frequency bands to be measured in the measurement and a set of parameters for the measurement gap related to the set of configured frequency bands.

3. The apparatus of claim 1, wherein when determining the requirement of the measurement gap, the at least one memory and the computer program codes are configured to, with the at least one processor, cause the first apparatus to perform at least one of:

in accordance with a determination, from the information, of an indication of a set of source frequency bands for the measurement, determining a set of target frequency bands to be measured for the measurement, and determining the requirement of the measurement gap related to the set of source frequency bands and the set of target frequency bands;

in accordance with a determination, from the information, of an indication of a set of target frequency bands to be measured for the measurement, determining the requirement of the measurement gap related to the set of target frequency bands and at least one source frequency band for the measurement supported by the first apparatus;

in accordance with a determination, from the information, of an indication of a set of source frequency bands and a set of target frequency bands to be measured for the measurement, determining the requirement of the measurement gap related to the set of source frequency bands and the set of target frequency bands; or in accordance with a determination, from the information, of an indication of a set of configured frequency bands to be measured in the measurement and a set of parameters for the measurement gap related to the set of configured frequency bands, determining the requirement of the measurement gap related to the set of configured frequency bands.

4. The apparatus of claim 1, wherein when transmitting the message, the at least one memory and the computer program codes are configured to, with the at least one processor, cause the first apparatus to:

transmit at least one of the following:

an indication that a configuration of the measurement gap is required for at least one pair of a source frequency band and a target frequency band for the measurement;

an indication that a configuration of the measurement gap is not required for at least one pair of a source frequency band and a target frequency band for the measurement;

an indication that a configuration of the measurement gap is required for at least one target frequency band for the measurement;

an indication that a configuration of the measurement gap is not required for at least one target frequency band for the measurement; and an indication that at least one predetermined pattern for the measurement gap is not applied for the measurement.

5. The apparatus of claim 1, wherein the at least one memory and the computer program codes are configured to, with the at least one processor, cause the first apparatus to:

receive, from the second apparatus, a set of parameters for the measurement gap configured by the second apparatus based on the requirement; and perform the measurement based on the set of parameters.

6. The apparatus of claim 1, wherein when transmitting the message, the at least one memory and the computer program codes are configured to, with the at least one processor, cause the first apparatus to perform at least one of:

in accordance with a determination that the measurement gap is needed for a set of configured frequency bands to be measured in the measurement based on the requirement, transmitting the message indicating that the measurement gap is needed; or in accordance with a determination that the measurement gap related to a portion of frequency bands in a set of configured frequency bands to be measured in the measurement is not needed based on the requirement, transmitting the message indicating that the portion of frequency bands supports the measurement without the measurement gap.

7. The apparatus of claim 6, wherein the at least one memory and the computer program codes are configured to, with the at least one processor, cause the first apparatus to:

receive, from the second apparatus, a set of parameters for the measurement gap related to the set of configured frequency bands other than the portion of frequency bands; and perform the measurement based on the set of parameters.

8. The device of claim 1, wherein the first apparatus comprises a terminal device and the second apparatus comprises a network device.

9. A second apparatus comprising:

at least one processor; and at least one memory including computer program codes;

the at least one memory and the computer program codes are configured to, with the at least one processor, cause the second apparatus at least to:

determine a set of frequency bands of a plurality of frequency bands supported by a first apparatus and associated with a measurement to be performed at the first apparatus;

generate information at least partially based on the set of frequency bands, wherein the information indicates the first apparatus to report a requirement of a measurement gap related to the set of frequency bands, and wherein the set of frequency bands is a subset of the plurality of frequency bands supported by the first apparatus and associated with the measurement; and transmit the information to the first apparatus.

10. The apparatus of claim 9, wherein when generating the information, the at least one memory and the computer program codes are configured to, with the at least one processor, cause the second apparatus to generate at least one of the following:

an indication of a set of source frequency bands for the measurement;

an indication of a set of target frequency bands to be measured for the measurement; and an indication of a set of configured frequency bands to be measured in the measurement and a set of parameters for the measurement gap related to the set of configured frequency bands.

11. The apparatus of claim 9, wherein the at least one memory and the computer program codes are configured to, with the at least one processor, cause the second apparatus to:

receive, from the first apparatus, a message associated with a requirement of a measurement gap for the measurement;

determine a set of parameters for the measurement gap based on the requirement; and transmit the set of parameters to the first apparatus.

12. The apparatus of claim 9, wherein the at least one memory and the computer program codes are configured to, with the at least one processor, cause the second apparatus to:

receive, from the first apparatus, a message indicating that a portion of frequency bands in a set of configured frequency bands to be measured in the measurement supports the measurement without the measurement gap;

determine a set of parameters for the measurement gap related to the set of configured frequency bands other than the portion of frequency bands; and transmit the set of parameters to the first apparatus.

13. The device of claim 9, wherein the first apparatus comprises a terminal device and the second apparatus comprises a network device.

14. A method comprising:

receiving, at a first apparatus and from a second apparatus, information at least comprising an indication of a set of frequency bands of a plurality of frequency bands supported by the first apparatus and associated with a measurement to be performed at the first apparatus, wherein the information indicates the first apparatus to report a requirement of a measurement gap related to the set of frequency bands, and wherein the set of frequency bands is a subset of the plurality of frequency bands supported by the first apparatus and associated with the measurement;

determining a requirement of a measurement gap for the measurement based on the information; and transmitting a message associated with the requirement to the second apparatus.

15. The method of claim 14, wherein receiving the information comprises receiving at least one of the following:

an indication of a set of source frequency bands for the measurement;

an indication of a set of target frequency bands to be measured for the measurement; and an indication of a set of configured frequency bands to be measured in the measurement and a set of parameters for the measurement gap related to the set of configured frequency bands.

16. The method of claim 14, wherein determining the requirement comprises at least one of:

in accordance with a determination, from the information, of an indication of a set of source frequency bands for the measurement, determining a set of target frequency bands to be measured for the measurement, and determining the requirement of the measurement gap related to the set of source frequency bands and the set of target frequency bands;

in accordance with a determination, from the information, of an indication of a set of target frequency bands to be measured for the measurement, determining the requirement of the measurement gap related to the set of target frequency bands and at least one source frequency band for the measurement supported by the first apparatus;

in accordance with a determination, from the information, of an indication of a set of source frequency bands and a set of target frequency bands to be measured for the measurement, determining the requirement of the measurement gap related to the set of source frequency bands and the set of target frequency bands; or in accordance with a determination, from the information, of an indication of a set of configured frequency bands to be measured in the measurement and a set of parameters for the measurement gap related to the set of configured frequency bands, determining the requirement of the measurement gap related to the set of configured frequency bands.

17. The method of claim 14, wherein transmitting the message comprises:

transmitting at least one of the following:

an indication that a configuration of the measurement gap is required for at least one pair of a source frequency band and a target frequency band for the measurement;

an indication that a configuration of the measurement gap is not required for at least one pair of a source frequency band and a target frequency band for the measurement;

an indication that a configuration of the measurement gap is required for at least one target frequency band for the measurement;

an indication that a configuration of the measurement gap is not required for at least one target frequency band for the measurement; and an indication that at least one predetermined pattern for the measurement gap is not applied for the measurement.

18. The method of claim 14, further comprising:

receiving, from the second apparatus, a set of parameters for the measurement gap configured by the second apparatus based on the requirement; and performing the measurement based on the set of parameters.

19. The method of claim 14, wherein transmitting the message comprises at least one of:

in accordance with a determination that the measurement gap is needed for a set of configured frequency bands to be measured in the measurement based on the requirement, transmitting the message indicating that the measurement gap is needed; or in accordance with a determination that the measurement gap related to a portion of frequency bands in a set of configured frequency bands to be measured in the measurement is not needed based on the requirement, transmitting the message indicating that the portion of frequency bands supports the measurement without the measurement gap.

20. The method of claim 19, further comprising:

receiving, from the second apparatus, a set of parameters for the measurement gap related to the set of configured frequency bands other than the portion of frequency bands; and performing the measurement based on the set of parameters.

* * * * *